US012313017B2

(12) United States Patent
Perrot

(10) Patent No.: US 12,313,017 B2
(45) Date of Patent: May 27, 2025

(54) METHOD OF DETERMINING CLOSING TIME OF NEEDLE VALVE OF A FUEL INJECTOR

(71) Applicant: DELPHI TECHNOLOGIES IP LIMITED, St. Michael (BB)

(72) Inventor: Baptiste Perrot, Blois (FR)

(73) Assignee: PHINIA JERSEY HOLDINGS LLC, Wilmington, DE (US)

( * ) Notice: Subject to any disclaimer, the term of this patent is extended or adjusted under 35 U.S.C. 154(b) by 0 days.

(21) Appl. No.: 18/277,296

(22) PCT Filed: Feb. 11, 2022

(86) PCT No.: PCT/EP2022/053417
§ 371 (c)(1),
(2) Date: Aug. 15, 2023

(87) PCT Pub. No.: WO2022/171822
PCT Pub. Date: Aug. 18, 2022

(65) Prior Publication Data

US 2024/0093655 A1 Mar. 21, 2024

(30) Foreign Application Priority Data

Feb. 15, 2021 (GB) ...................................... 2102078

(51) Int. Cl.
*F02D 41/20* (2006.01)
*F02D 41/24* (2006.01)

(52) U.S. Cl.
CPC ........... *F02D 41/20* (2013.01); *F02D 41/247* (2013.01); *F02D 2041/2055* (2013.01)

(58) Field of Classification Search
CPC ...... F02D 41/20; F02D 41/247; F02D 41/248; F02D 41/2451; F02D 41/3005;
(Continued)

(56) References Cited

U.S. PATENT DOCUMENTS 6,848,626 B2 2/2005 McCoy et al.
11,300,070 B2 * 4/2022 Aono ...................... F02D 41/20
(Continued)

FOREIGN PATENT DOCUMENTS

EP 2060762 A1 5/2009
EP 2685074 B1 4/2018
GB 2515359 A 1/2014

OTHER PUBLICATIONS

International Search Report for PCT/EP2022/053417 dated Jun. 24, 2022, 3 pages.

*Primary Examiner* — Logan M Kraft
*Assistant Examiner* — Johnny H Hoang
(74) *Attorney, Agent, or Firm* — Warner Norcross + Judd LLP

(57) ABSTRACT

A method of controlling a solenoid controlled fuel injector including a solenoid controlled actuator adapted to control a needle valve comprises the steps of: a) providing a reference curve/signal;

b) activating the injector by sending an activation pulse to the solenoid, and measuring the voltage signal to provide a solenoid voltage signal, determining a difference signal, Delta_signal; d) differentiating the signal of step c) to provide a first differential signal; e) from step d) providing a signal of values; f) differentiating the plot/single of step d) to provide a second derivative of the Delta_signal; g) multiplying the values of plots/signals from step f), step e) and c) to provide a further plot; h) determining the valve closing time; i) subsequently controlling the fuel injector based on the result of step h).

10 Claims, 2 Drawing Sheets

(58) Field of Classification Search
CPC ........... F02D 41/402; F02D 2041/2055; F02D 2041/2027; F02M 51/061; F02M 51/0685; F02M 51/0625; F02M 61/04; F02M 61/14; F02M 63/0068; F02M 63/0063
USPC .................................................. 701/103–105
See application file for complete search history.

(56) References Cited

U.S. PATENT DOCUMENTS

| | | | | |
|---|---|---|---|---|
| 2002/0130192 | A1 | 9/2002 | McCoy et al. | |
| 2012/0185147 | A1* | 7/2012 | Beer | F02D 41/20 701/102 |
| 2013/0073188 | A1 | 3/2013 | Rosel | |
| 2014/0014072 | A1 | 1/2014 | Bouaita | |
| 2015/0377173 | A1* | 12/2015 | Tritsch | F02D 41/3005 123/476 |
| 2016/0076498 | A1* | 3/2016 | Aono | F02D 41/2467 123/490 |
| 2016/0102628 | A1* | 4/2016 | Denk | F02D 41/2467 324/113 |
| 2022/0034276 | A1* | 2/2022 | Kimura | F02D 41/20 |

* cited by examiner

METHOD OF DETERMINING CLOSING TIME OF NEEDLE VALVE OF A FUEL INJECTOR

CROSS-REFERENCE TO RELATED APPLICATIONS

This application is the U.S. National Stage of International Application No. PCT/EP2022/053417 filed on 11 Feb. 2022, which claims priority to and all advantages of United Kingdom Application No. 2102078.9 filed on 15 Feb. 2021, the contents of which are incorporated herein by reference.

TECHNICAL FIELD

This invention relates to a method of determining the closing time of needle valve a fuel injector. It thus relates to determining the timepoint when e.g. the needle of a needle valve of the fuel injector, contacts the valve seat of the needle valve, to prevent fuel flowing into a combustion chamber.

BACKGROUND OF THE INVENTION

Modern fuel injectors typically use electrical actuators (such as piezo or solenoid operated actuators) which are used to operate or control a needle valve, the valve opening and closing in order to dispense fuel to a combustion chamber via movement of a needle of a needle valve away from a valve seat. Typically an activation pulse(s) of certain duration (pulse width) is sent to the electrical actuator operate the fuel injector. The quantity of fuel injected into a combustion space is dependent on the duration of the pulse(s). Fuel injectors may be of the type where the actuator directly moves the pintle/needle away from the valve seat; against e.g. the biasing spring means; this is referred to as a direct injector, and such injectors are used for both gasoline and diesel. In an alternative design many modern fuel injectors are hydraulically operated in that rather than the actuator actuating the needle directly, the actuator to operate a valve (system) so as to control pressure in the fuel injector so as to indirectly move the needle from the valve seat so as to selectively dispense fuel. Thus, there is a distinction between actuator operated valve opening and closing, and needle opening and closing in such injectors.

The characteristics of fuel injectors change over time. Therefore, it is necessary to perform closed loop control and compensation strategies. So injectors are typically compensated over time by performing learning strategies, where the behaviors and characteristics of the fuel injector are learnt over time, in order to compute correction values with respect to e.g. activation pulse duration and applying these compensation values or "trims" during live injector operation. This strategy is often called ICLC (Injector Close Loop Compensation)

The closing delay CD (or alternatively referred to as closing response time CR) of a solenoid operated fuel injector (such as a direct acting gasoline injector or hydraulic fuel injector) is defined as the time between the end of the activation pulse sent to the solenoid of the solenoid actuator, and the needle closing time (i.e. when the needle of the valve reaches the valve seat to prevent fuel flowing). This parameter is important to know for feedback control of the fuel injector. This is determined by determining the needle closing time (NCT); which may be another important parameter in feedback control systems.

The needle closing time (NCT) can be determined by analyzing the differential voltage across the injector solenoid i.e. solenoid of the solenoid actuator. When pintle/needle of the injector hits the needle valve seat on closing; closure, the actuator solenoid coil voltage slope changes, and can be observed in a time plot as a "glitch": so glitch time occurs at the needle closing time and the time between this glitch and the end of the pulse is called closing response (CR) or closing delay.

The glitch is a point of inflection and so in conventional systems, in order to determine the time of glitch, the voltage across the solenoid is differentiated using a derivative method; and the $1^{st}$ (and/or preferably second derivatives) of the voltage signals are analyses to more readily detect and determine the glitch and thus the NCT. More refined methods use trigonometry method to find a big angle variation (in the voltage plot this needs less ECU calculation time than initial method.

A problem is that closing response measurement/estimation (i.e. time until the valve closes) spread is high at low fueling; leading to a poor response in accurate control. It is thus necessary to accurately determine the NCT. However prior art methods are not robust when it comes to detecting small glitches. Low magnitude glitch signal may be due to injector design, injection pressure or environmental conditions such as temperature and fluid properties. Furthermore with some injector definition (e.g. M14) there may be two successive events. For example, on M14 injector design, you have two physical events: when the pintle contact the seat, creating the $1^{st}$ event and when the armature continues it movement towards the stop ring, creating the $2^{nd}$ event. These both create a voltage inflection of similar magnitude and the detection criterion is scattered as shown below because it may detect the first or second event in a shot-to-shot sequence.

SUMMARY OF THE INVENTION

In one aspect is provided, in a solenoid controlled fuel injector including a solenoid controlled actuator, said actuator adapted to control a needle valve by the movement of a needle to and from a valve seat of said needle valve, a method of determining the closing time of the needle valve when the valve needle contacts the valve seat during an operational cycle of said fuel injector, and subsequently controlling said injector based on said closing time comprising the steps of a) providing a reference curve/signal, Ref (7);

b) activating said injector by sending an activation pulse to said solenoid, and from a timepoint after the end of the activation pulse, measuring the voltage signal across the terminals of said solenoid to provide a solenoid voltage signal, Raw signal, (8)

c) determining a difference signal, Delta_signal (9) based on of the difference between the signal of a step a) and that determined in step b);

d) differentiating said signal of step c) to provide a first differential signal Diff1 (11)

e) from step d) providing a signal Diff 1_Normalised of values, whose values decrease the further away from zero the values of Diff1 are;

f) differentiating the plot/single of step d) to provide a second derivative Diff2 (17) of said Delta_signal g) multiplying the values of plots/signals from step f), step e) and c) to provide a further plot, Mix (19)

h) determining the maximum peak value of the plot from step g), or a filtered version thereof, and determining the valve closing time from the time point of said determined maximum peak;

i) subsequently controlling said fuel injector based on the result of step h).

Said reference curve/signal, Ref (7) may be indicative of the voltage across the solenoid against time of said injector or a reference injector during an operational cycles where injection does not occur.

Said reference curve/signal, Ref (7) may be learned by activating said injector under test without injection occurring where the pulse length in the activation is below the minimum drive pulse (MDP).

The method may including determining a cut-off time, $t_{co}$, after the end of the activation pulse and performing the method steps only after this time, or setting values of Diff1 Normalised, Diff2, or Delta to zero before this time.

The method may comprising the intermediate step of providing a plot/signal Diff1 Sat comprising a plot of Diff 1 with any values of Diff 1 which are less than a threshold, X, are set to −X, and where in step e) comprises providing a signal Diff 1_Sat Normalised of values, whose values decrease the further away from zero the values of Diff1 Sat are; Said threshold value, X, may be determined from the value of peak positive value of the plot of Diff 1.

The values of step e) are preferably non-dimensional values.

Said values are determined based on the following formula:

$$|(Z-D1(t))|/Z \text{ or } |(D1(t)-X)|/X$$

where D1 represents Diff 1 (D10 or Diff 1 Sat (D1S)

$$|(Z-D1S(t))|/Y \text{ or } |(D1S(t)-Z)|/Y$$

where Z and Y are any selected values.

Subsequent to step c) said difference signal, Delta_signal (9) may be filtered before processing in subsequent steps.

Subsequent to step d) said first differential signal Diff1 (11) may be filtered before processing in subsequent steps.

The term "activating said injector" can be construed as implementing an operation cycle of injector.

BRIEF DESCRIPTION OF THE DRAWINGS

The present invention is now described by way of example with reference to the accompanying drawings in which.

DESCRIPTION OF THE PREFERRED EMBODIMENTS

Figure 1:
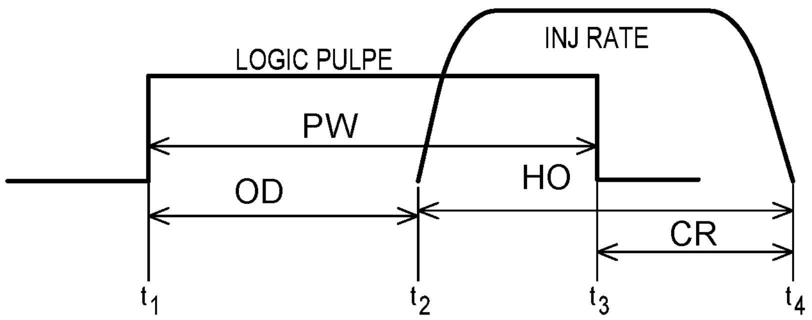
FIG. 1 shows simplified plots against time of an activation (logic) pulse sent to the solenoid of a solenoid activated fuel injector and the fuel injection rate i.e. from the needle valve.

FIG. 1 shows simplified plots against time of an activation (logic) pulse 1 sent to the solenoid of a solenoid activated fuel injector which includes a needle valve as known in the art, and plot 2 shows the fuel injection rate i.e. from the needle valve. The pulse width (PW) is of the activation pulse is shown; starting from t1 and ending at t3. The needle valve opening and closing general is delayed; from the activation pulse start/end respectively. The needle valve opens at point t2 and closes at t4; hence fuel is injected between these times; HO refers to the time therebetween which is referred to as the hydraulic opening or needle valve opening time, where fuel is injected into a combustion space. The closing response (CR) (often referred to alternatively as closing delay (CD) is the time between points t3 and t4. t4 is the needle closing time (NCT). The opening delay (OD) is that between t1 and t2, from the start of the activation pulse to the start of the needle valve opening. This parameter is important for the control.

Figure 2A:
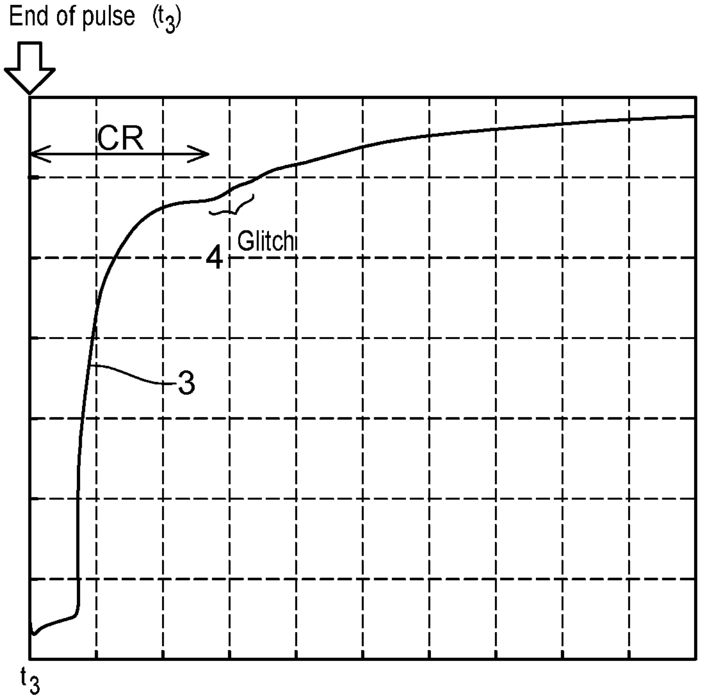
FIG. 2*a* shows a timeline of the voltage 3 across the solenoid of the actuator.
Figure 2B:
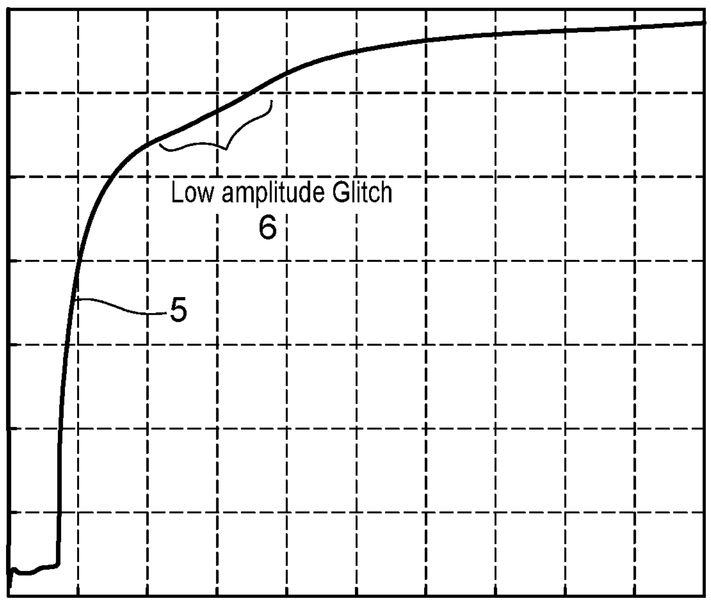
FIG. 2*b* shows a similar plot with a low voltage signal, and low amplitude glitch.

FIG. 2*a* shows a timeline of the voltage 3 across the solenoid of the actuator starting from the time after the end of the activation pulse t3. As can be seen in the region 4 is observed a glitch where it is assumed the needle valve closes i.e. at the end of the closing delay at the needle closing time (NCT). FIG. 2*b* shows a similar plot with a low voltage signal 5, and low amplitude glitch 6.

The terms "plot" "signal" and "curve" are alternative names and may be interchangeable i.e. relate to the same thing

INVENTION

Below is described in detail the steps involved in implementing an example of the invention. As will be clear later, in examples not all these steps need to be implemented and may be in differing order.

Step 1

In examples of the invention, firstly a reference solenoid voltage signal (i.e. a timewise plot) is provided. The reference signal (Ref) or plot may be stored e.g. in a MAP in the engine ECU as is known in the art. The reference signal may represents the voltage that would occur across the actuator solenoid of a nominal/standard/reference fuel injector based on a small pulse without injection. So said reference curve/signal, Ref (7) is learned by activating said injector under test without injection occurring where the pulse length in the activation is below the minimum drive pulse (MDP). E.g. typically a very short PW, 100 μs for example, when MDP is around 200 μs on current injector.

The voltage is thus the difference between LOW SIDE DRIVE and HIGH SIDE DRIVE of the tow pins of the injector. It generally comprises a plot of steep slope whose gradient shallows with time. In other word the plot may be a plot where voltage rises (with time from a base level such as zero) of decaying gradient i.e. reaching a near asymptotic value). The plot may be learned by measuring and recording the voltage signal subsequent to the activation of a fuel injector i.e. preferably the one under test in order to have individual reference per injector if wanted, instead of generic reference map/plot). Such a plot (Ref) is shown as reference numeral 7 in figure in 3.

Step 2

The injector under test i.e. whose characteristics are to be determined for closed loop control, is activated with an activation pulse. This is may not be the same length/duration as that for provided to get the reference curve. Actually For reference curve, we need acting pulse with very small pulse width (PW), without fueling, for example 100 μs (MDP is about 200 μs for example). For step 2, this can be done on any pulse you want to find a Closing Response/Closing time), so may be from (Minimum Drive Pulse) to a larger PW) and the voltage signal across the solenoid of the solenoid actuator is obtained/determined e.g. recorded. The plot may start at a (pre-)set time after the end of the activation pulse ends. This is shown as plot/signal 8 in FIG. 3 and is designated "Raw signal".

Step 3

Figure 4:
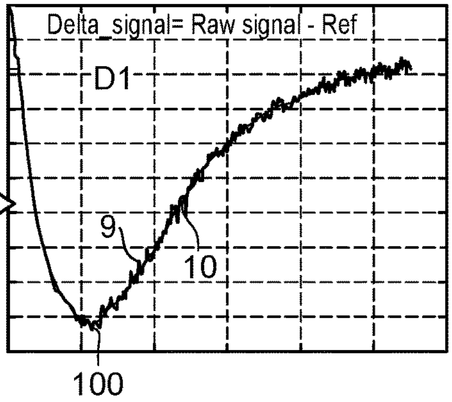

In the next step the reference curve 7 (values) are subtracted from the actual measured (voltage) of the signal 8 determined in step 2 (or vice versa) to provide a difference voltages signal/plot, referred to a "delta_signal" or D1, shown as plot 9 in FIG. 4.

So the difference between the plots (signals 7 and 8) is determined to find plot 9 which is Delta_signal=Raw signal (8)_−Ref (7) (reference signal); that is to say one subtracted from the other. This resultant plot 9 may preferably be filtered to provide plot 10. (filtered delta signal 10).

Either or both reference and actual plots/signals 7 and 8 (Ref, Raw signal) may be appropriately scaled to match and have the same starting reference time point, which may be at any time after the end of the activation pulse (t3).

Figure 3:
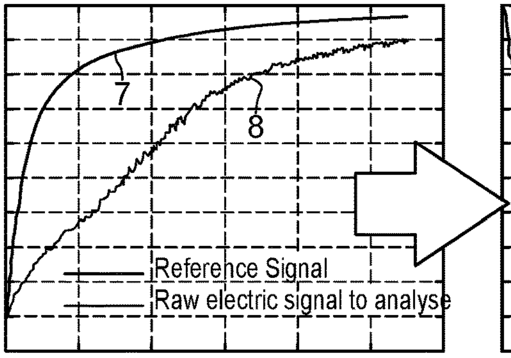
FIGS. 3 to 7 show plots obtained in steps of the methodology according to one example FIG. 8 outlines the overall process according to one example

So, to recap, subtracting one plot form the other (it doesn't matter which) provides a plot of difference values D1 ("delta_signal") and this is analyzed/processed further to determine the needle valve closing time in the following steps. FIG. 3 shows a measures (current) voltage across the solenoid (the plot starting or generally measured starting from a timepoint at or shortly after the end of the activation pulse) 8, which can be regarded as the equivalent to plot 5 of FIG. 2*b*, along with a reference curve (signal/plot) 7. This reference signal or plot can be stored e.g. in a MAP as mentioned and may be stored as a series of values; or as an equation. Methods of storing effective reference plots/signals are known to the skilled person and will not be elaborated further. The signal Delta_signal (D1) is process further as below:

Step 4

Figure 5:
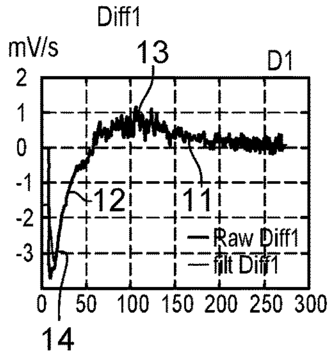

The signal 9 of the difference (Delta_signal) D1 or the filtered delta signal 10 is differentiated with respect to time this step (step 4) to obtain signal Diff1, shown with reference numeral 11, in FIG. 5. This again may be filtered to produce filtered differential signal 12 (filt Diff1). In FIG. 5 the y-axis units are in e.g. mV/s. It is noted that the units show steps of are 1 mV/s. As can be seen the value of Diff1 peaks (with respect to a maximum) close to 1 mV/s at point 13. It has a sharp negative peak 14 intitially.

Step 5 (Optional)

Figure 6:
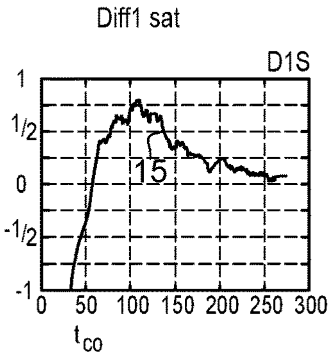

From signals Diff1 (or filt Diff1), a further signal is computed referred to as Diff 1_sat; shown in FIG. 6 with reference numeral 15. This is the same as Diff1 except the first part of the Diff1 plot is chopped of in that it is set to zero, or effectively plot before a cut off time tco are set to zero (which subsequently effectively means the method ignores this period beforehand so as to get rid of the anomalies caused by the initially sharp negative peak 14.

In one method, in order to compute this plot, a value "X" is selected. This value (which is in mV/S) may be nominal but should be a positive value and generally higher than the positive peak value 13 attained in plot 11/12; i.e. higher than the peak value of Diff1 at point 13 in FIG. 5. In this case a value of X=1 is selected.

This value is used to provide a "saturation effect" on plot Diff1 to produce plot Diff1_Sat; this is so as to remove massive changes of gradient which occur e.g. in the first time portion of plot of Diff1 shown at point 14. This is up to the cut-off time point tco. Effectively any values less than −X (i.e. up to timepoint $t_{co}$) are set at −X.

Thus in plot 6 the computed values of Diff1_Sat below a negative nominal value X are set to −X. Thus between t=0 and $t=t_{co}$, the values of Diff1_Sat are set to −X. So, to summarise the interest in signal analysis is focused on 0 crossing of Diff1. Diff1 is then saturated at +/−X around 0. This signal is now called "Diff1_sat".

So, to recap the value X is selected appropriately by the skilled person, it can be reasonably arbitrary and vary from zero upwards but is preferably in the region of the value of the maximum value in the Diff1 plot so at point 13, and preferably just above it. It should be remembered that the plots may vary with different activations. If one envisages several plots where an envelope and it may be is preferable the max value of Diff1 never rises about the selected vale of X.

Step 5 is optional, and is implemented to ignore the effects of large negative values which may occur at the beginning of a time window after the end of the activation pulse. In an alternative to overcome i.e. ignore these effects this step can be replaced by simply carrying out the method steps (i.e. previous and remaining method steps) only from the time point $t_{co}$; i.e. selecting a time window for the whole process/methodology which is past the large negative peak 14. The skilled person would be able to determine the value of $t_{co}$ which is adequate to ensure the large negative peak is past; i.e. effectively/eliminated Step 6

In the next step the plot/signal Diff1_Sat (D1S) [or the signal Diff1 (D1) after tco] is translated into absolute signal value and normalized around 0, to produce a normalised plot signal Diff 1_Normalised (D1N) (whose values decrease the further away from zero the values of Diff1/Diff1_sat are. Where step 5 is carried out Diff1 Normalised may be referred to as Diff1 Sat Normalised (D1SN)

That can be effected by the following means: if |D1|=0, then 100% [or 1], and if |D1|=X, then Diff1_Normalised is 0% [or 0] with linear behavior between 0 and X.

And correspondingly that means: if |D1S|=0, then 100% and if |D1S|=X, then Diff 1 Sat Normalised (D1SN) is 0% with linear behavior between 0 and X.

It is to be noted that in the claims reference to Diff 1_Normailised should be interpreted as above e.g. signal Diff 1_Normalised comprises positive values which decrease the further away from zero the values of Diff1 or Diff1_Sat are.

Figure 7:
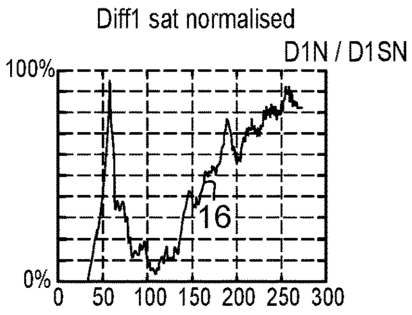

So the output signal in this step, which will be used in a final multiplication formula, is called Diff 1_Normailised and where step 5 is carried out, Diff 1 Sat Normalised (D1SN); this is shown with reference numeral 16 in FIG. 7.

In other words, at time points "t" a % or fraction value Diff 1_Normalised or Diff 1 Sat Normalised (D1SN) is determined from the formulae $$|(Z-D1(t))|/Z \text{ or } |(D1(t)-X)|/X$$

Where D1 represents Diff 1 (D10 or Diff 1 Sat (D1S)

So, the values vary from 0% to 100% in this example (0 to 1 as a factor)

This formula is not exhaustive and the skilled person would envisage other formulae. A more general formula may be:

$$|(Z-D1(t))/Y \text{ or } |(D1(t)-Z)|/Y$$

Where Z and Y can be arbitrary values. So, the factor may go from 0 to 2 (200%) The result is to produce a plot of non-dimensional (factor) values plot which decrease in magnitude depending on the absolute difference between zero and the value of Diff1/Diff1_Sat. In the penultimate step there is a multiplication process using this factor and the shape of the subsequent plot is analyzed so it is not important what the scale of the plot of Diff 1_Normailised/Diff 1 Sat Normalised (D1SN) is.

Step 7

Figure 8:
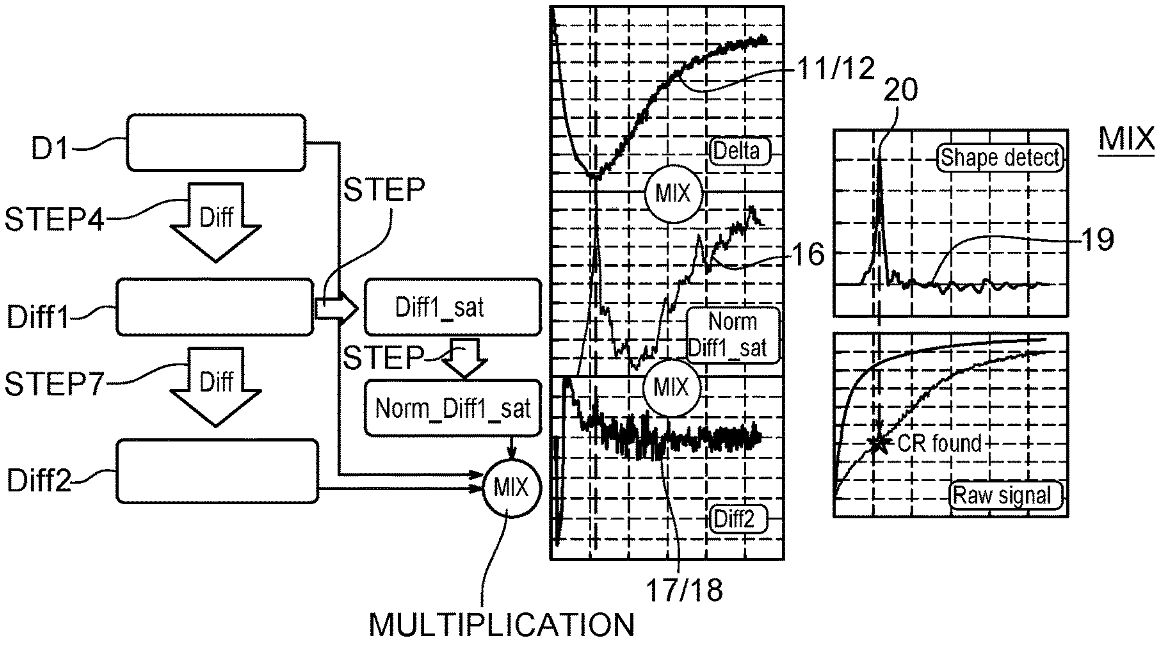

In this step differential plot/signal (Diff 1) 11 (or the filtered plot 12) is then further differentiated with respect to time to determine the second derivative signal/plot (Diff2) shown with reference numeral 17 in FIG. 8 which may optionally be filtered to provide plot 18.

Step 8

There is then a combination process by multiplying signals Delta_signal (9/10), Diff 2 and Diff 1_Normailised/Diff1 Sat Normalised (D1SN) to provide plot Mix (19) see FIG. 8. That is to say multiplying the values of the signal at same timepoints to produce a further signal plot 19.

In other word produce this plot Mix, signal values at the same time points of Delta_signal (9/10), Diff 2 and either [Diff 1_Normailised/Diff 1 or Sat Normalised (D1SN)] are multiplied together.

$$\text{Mix}=\text{Delta\_signal}(D1)*\text{Diff1\_Normailised}(D1N)*\text{Diff2}$$

or $$\text{Mix Delta\_signal}(D1)*\text{Diff1 Sat Normalised}(D1SN)*\text{Diff2}$$

It should be noted that any of the parameters which are multiplied may be filtered versions of the signal.

Step 9

The signal/plot Mix 19 is analyzed to find the maximum value thereof i.e. by determining the highest peak (which is peak 20 in plot 19). It is at this time "tg" that the glitch occurs and is indicative of needle closing time.

FIG. 8 illustrates some of the above steps.

Other

As mentioned the methodology is preferably performed only from a time point $t_{co}$; i.e. selecting a time window for the whole process/methodology which is past the large negative peak 100. The skilled person would be able to determine the value of $t_{co}$ which is adequate to ensure the large negative peak is past; i.e. effectively/eliminated.

Other

It should be noted that the step of providing D1S is effectively stating that the procedure of multiplying the values of Delta_signal (9/10), Diff 2 and Diff1_Normailised (D1N) is only done after a time $t_{co}$ which is a cut-off time selected so that it is hopefully after the initial negative peak. This is because the vales of Norm_Diff 1_sat before $T_{co}$ are set to zero and so the product form the multiplication would also be zero.

In other words, in preferred examples the methodology of multiplication of value only occurs after the end of $t_{co}$.

The methodology of multiplication of value may preferably occurs before a further cut off time (tco2) in a time window where the glitch is expected, and preferably away for sharp change is the difference curve, not caused by needle closing.

As a result, CR robustness and determination is highly improved compared to previous methodology:

CR of injector with very flat glitch can now be determined with the claimed methodology.

Moreover, reference shape can come from a generic shape (stored in ECU) or can be directly measured per injector, giving an individual and adaptative reference per part. On part with 2 successive low events, the first one is consistently detected by this method.

The invention claimed is:

1. A method of controlling a solenoid controlled fuel injector including a solenoid controlled actuator adapted to control a needle valve by the movement of a needle to and from a valve seat of the needle valve, said method comprising the steps of:

a) providing a reference signal, wherein the reference signal is indicative of the voltage across the solenoid against time of the injector during an operational cycle where injection does not occur;

b) activating the injector by sending an activation pulse to the solenoid, and from a timepoint after the end of the activation pulse, measuring the voltage signal across the terminals of the solenoid to provide a solenoid voltage signal;

c) determining a difference signal based on the difference between the reference signal of step a) and the measured voltage signal of step b);

d) differentiating the difference signal of step c) to provide a first differential signal;

e) from step d) providing a normalized signal in which the first differential signal is translated into absolute value and normalized around zero;

f) differentiating the first differential signal of step d) to provide a second differential signal;

g) multiplying the values of the signals from step f), step e) and step c) to provide a plot;

h) determining the maximum peak value of the plot from step g) and determining the valve closing time from the time point of the determined maximum peak; and i) subsequently controlling the fuel injector based on the result of step h).

2. A method as claimed in claim 1 wherein the reference signal is learned by activating the injector under test without injection occurring where the pulse length in the activation is below the minimum drive pulse.

3. A method as claimed in claim 1 including determining a cut-off time after the end of the activation pulse and performing the method steps only after this time, or setting values of the normalized signal, the second differential signal, or the difference signal to zero before this time.

4. A method as claimed in claim 3 comprising the intermediate step of providing a saturated signal comprising a plot of the first differential signal with any values of the first differential signal which are less than a threshold, X, are set to −X, and where in step e) the normalized signal provided from the saturated signal.

5. A method as claimed in claim 4 where the threshold value, X, is determined from the value of peak positive value of the plot of the first differential signal.

6. A method as claimed in claim 1 wherein the values of step e) are non-dimensional values.

7. A method as claimed in claim 6 where the values are determined based on the following formula:

$$|(Z-D1(t))|/Z \text{ or } |(D1(t)-X)|/X$$

where D1 represents the first differential signal or a saturated differential signal $$|(Z-D1S(t))|/Y \text{ or } |(D1S(t)-Z)|/Y$$

where Z and Y are any selected values.

8. A method as claimed in claim 1 where subsequent to step c) the difference signal is filtered before processing in subsequent steps.

9. A method as claimed in claim 1 where subsequent to step d) the first differential signal is filtered before processing in subsequent steps.

10. A method as claimed in claim 1 wherein the reference signal in step a) is indicative of the voltage across a reference injector.

* * * * *